UNITED STATES PATENT OFFICE.

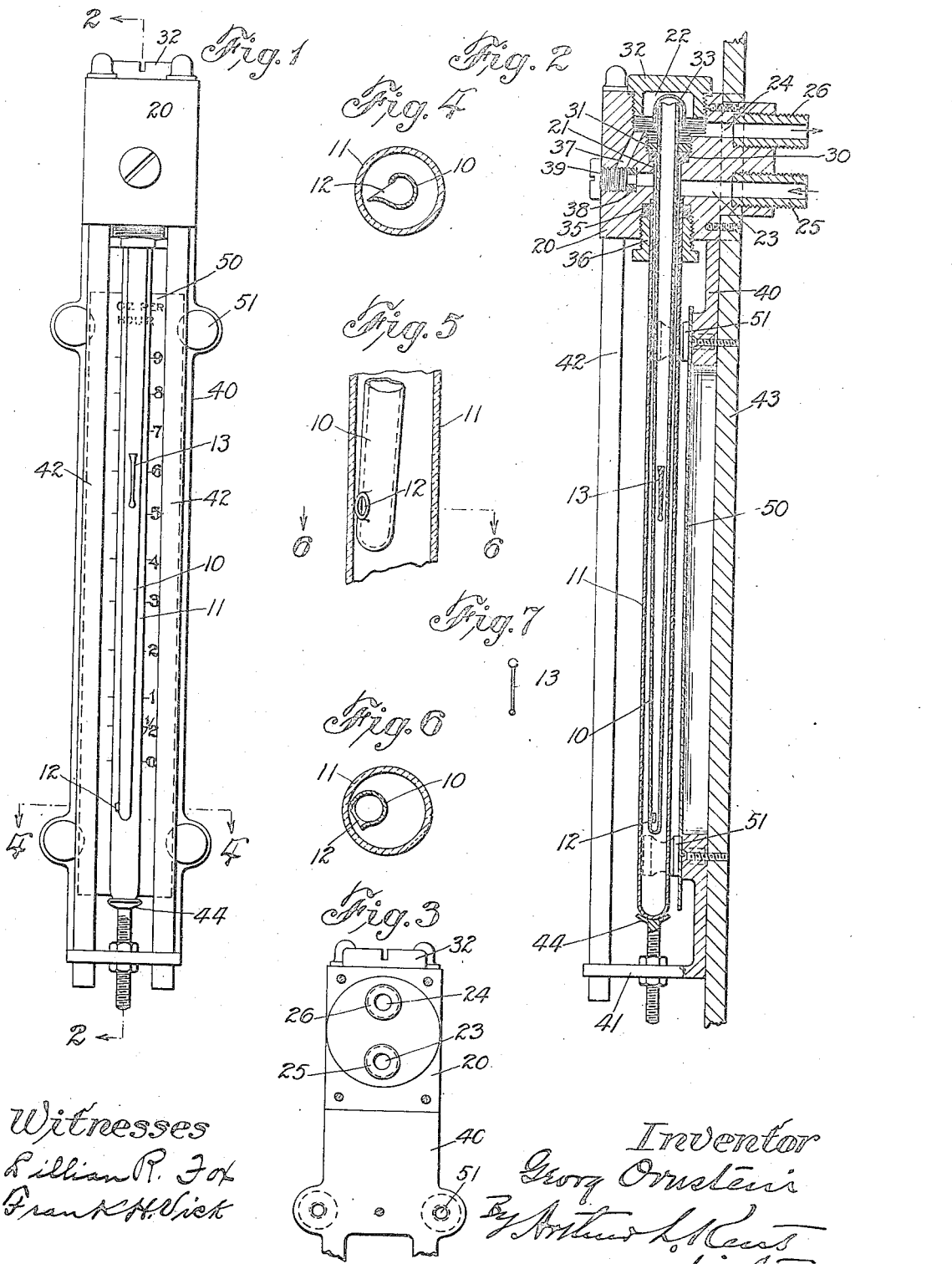

GEORG ORNSTEIN, OF NEW YORK, N. Y., ASSIGNOR TO ELECTRO BLEACHING GAS COMPANY, A CORPORATION OF NEW YORK.

FLOAT-METER.

1,188,984.          Specification of Letters Patent.     Patented June 27, 1916.

Application filed February 16, 1915. Serial No. 8,676.

*To all whom it may concern:*

Be it known that I, GEORG ORNSTEIN, a citizen of the German Empire, residing at New York city, in the county of New York and State of New York, have invented certain new and useful Improvements in Float-Meters, fully described and represented in the following specification and the accompanying drawings, forming a part of the same.

This invention relates to meters or gages for measuring the rate of flow or fluids, of that type in which the rate of flow is indicated by the position of a loose or floating piston or float in a passage through which the fluid to be measured or a portion thereof flows and which is of gradually increasing cross-sectional area in the direction of the flow of the fluid therethrough, the indicating piston or float being supported by the flowing fluid and rising with increase in the rate of flow of the fluid and falling with decrease in the rate of flow.

Such float meters as heretofore made have the disadvantage that the tapered float tube has been liable to become broken in transportation or when in use through faulty connections at its ends, or because of its notwithstanding the internal pressure when used to measure the rate of flow of fluids under very high pressure.

The present invention aims to overcome these disadvantages and to provide a float meter so constructed that all danger of bursting of the float tube when the meter is used for measuring the flow of fluids under high pressure is avoided and liability of breakage of the tube in transportation or because of faulty connections is greatly lessened.

The invention also aims to otherwise improve meters of this type, and generally to provide a meter which shall be accurate and dependable in operation and of comparatively simple and inexpensive construction, and which may be readily connected at the place of use without danger of affecting the adjustment of the meter or its accuracy in operation.

To these ends, the invention consists in the features of construction, arrangement and combination of parts as hereinafter more fully described and specifically pointed out in the claims.

The invention has been made especially with the idea of providing an improved meter for measuring the rate of flow of chlorin in the gaseous state, out meters made in accordance with the invention may of course be used for measuring the rate of flow of other gases and of liquids, or for other measurement purposes.

A full understanding of the invention can best be given by a detailed description of a construction embodying the various features of the invention in an approved form, and such a description will now be given in connection with the accompanying drawings illustrating such an approved construction and a modification thereof.

In said drawings:—Figure 1 is a front elevation of a flow meter made in accordance with my invention; Fig. 2 is a central sectonal view taken on line 2—2 of Fig. 1; Fig. 3 is a rear view of the upper part of the meter with the supporting plate removed; Fig. 4 is a detail cross-sectional view through the inlet end of the tapered float tube; Fig. 5 is a detail view of a portion of the float tube and of the outer tube illustrating a modified or alternative construction; Fig. 6 is a cross-sectional view similar to Fig. 4 but taken on line 6—6 of Fig. 5; and Fig. 7 is a side view of a slightly modified form of float.

Referring to the drawings, and first to Figs. 1, 2, 3 and 4, the device shown comprises a tapered float tube 10 of glass or other suitable transparent material supported in vertical position by supporting means engaging the upper end of the tube, an outer tube 11 also partly or entirely of glass or other suitable transparent material and most desirably wholly of such material which extends about the float tube and is of sufficient size to provide a chamber or space between it and the float tube. The outer tube 11 is most desirably closed at its lower end which extends below the lower end of the float tube, and it is supported from its upper end by means engaging it at a point below the point of support of the float tube. The fluid to be measured enters through the top of the outer tube, flows down about the float tube, enters the float tube through an inlet orifice 12 and flows up through the float tube to escape from the upper end of the tube through a suitable connection. Within the float tube is a suitable loose floating piston or float 13.

For supporting the float tube and the outer or inclosing tube 11 and for providing suitable connections for the in-flow and outflow of the fluid which passes through said tubes, I provide in the form of device shown a solid head piece 20 of brass or other suitable metal or other material formed with a central vertical passage 21 and with an upper chamber or recess 22 into which the passage 21 opens and which extends through the top of the head 20, the passage 21 opening downward through the bottom of the head and being enlarged at its lower end to provide a packing space. An inlet passage 23 leads into the passage 21 and an outlet passage 24 leads from the chamber 22, and the head piece is, as shown, formed with threaded sockets to receive coupling pieces 25 and 26 by means of which connection is made with the flow line of the gas or liquid to be measured.

The upper end of the float tube 10 extends up through the passage 21 and into the chamber 22 and the tube is secured and held in place by means of a packing ring 30 of soft rubber or other suitable material which is held by means of a threaded collar or annular nut 31 which screws into a reduced portion of the chamber 22 to press the packing 30 tightly against the tube to hold it in place and make a tight joint about it. The chamber 22 is closed by a cap 32 which may be a screw cap as shown. To prevent the entrance of any dust or other material into the upper end of the float tube a loose cap 33 is placed over the end of the tube, the end of the tube and the cap being formed so that the outflow from the tube will not be hindered.

The upper end of the outer tube 11 extends outside the float tube up into the packing space at the lower end of the passage 21 and is held in place and a tight joint formed about it to prevent escape of fluid by means of packing 35 of soft rubber or other suitable material which is compressed by a threaded follower 36. The upper end of the tube may rest against the shoulder as shown by which the upward movement of the tube is limited.

With the tubes so connected in the head 20, the open upper end of the outer tube 11 will be in connection with the inlet passage 23, and the open upper end of the float tube will be in connection with the outflow passage 24. In order to increase the capacity of the meter, a by-pass 37 may be provided connecting the passage 21 with the chamber 22 formed by passages in the head 20 leading from the passage 21 and chamber 22 respectively to a threaded cavity in which is set between the ends of the passages a threaded orifice piece 38 having an orifice of suitable size. The cavity is closed by a screw plug 39. By replacing the orifice piece 39 with a solid or imperforate piece the by-pass may be closed and all the fluid caused to flow through the float tube.

Extending downward from the head piece 20, is a back piece or scale support 40 which carries at its lower end a forwardly extending bracket 41. The bracket 41 is perforated at its two front corners to receive the lower ends of guard rods 42 which pass through correspondingly positioned holes in the head piece, being held from dropping through by being provided with flanged heads in the usual manner. The back piece 40 may be secured to the head piece in any suitable way, or, as shown, the head piece and back piece may be independently secured by means of screws or otherwise to a supporting plate or board 43.

To prevent the outer tube 11 from being forced down out of the head by the pressure of the fluid therein, a support 44 is provided for the lower end of the tube. This support is best made adjustable as shown, or in other suitable manner, to permit of its being brought into position for tubes of slightly varying length and also to permit it to be moved away from the tube to allow of removal of the tube, or when for any reason it is desired that the tube shall not be rigidly held at its lower or free end.

With the construction above described all danger of bursting of the float tube by pressure of the fluid being measured is avoided since the pressure in the space between the two tubes, and, therefore, the pressure on the outside of the float tube, is always equal to the pressure within the float tube or substantially so. The outer tube being simply a cylindrical tube may of course be readily made of any thickness and strength necessary to resist any internal pressure to which it may be subjected in the use of the device. It is not practicable, however, to make the tapered float tubes of great thickness and strength because of difficulties in and cost of manufacture. By providing means for maintaining a pressure against the outside of the float tube substantially equal to the pressure within the tube, I not only avoid such danger of bursting of the tube as has heretofore existed, but I am enabled to use thinner tubes of less strength without danger of bursting. Furthermore, the float tube is always protected by the stronger outer tube, and being supported only at its upper end danger of breaking of the tube through strains thereon resulting from imperfections in, or imperfect adjustment of, fittings at the two ends of the tubes is avoided.

When used to measure the rate of flow of a fluid, the meter is connected in the flow line of the fluid to be measured, and if the by-pass 37 is closed all the fluid will flow down through the tube 11, enter the float tube through the inlet orifice 12 and flow up through the float tube and out through the chamber 22 and outlet passage 24. The float 13 will be raised by the up-flowing fluid a greater or less distance according to the rate of flow of the fluid through the float tube, and, a suitable scale being provided, the position of the float will indicate at all times the rate of flow. If the by-pass 37 is open, an orifice piece 38 having an orifice of suitable size being set in the by-pass cavity, then only a part of the fluid will pass down through the outer tube 11 and up through the float tube, but with an increase or decrease in the rate of flow of the fluid there will be an increase or decrease in the amount flowing through the float tube, and the float will therefore rise as the rate of flow of the fluid increases and fall as it decreases and will indicate the rate of flow on a suitably calibrated scale.

The scale markings for each instrument should of course be determined empirically, and the scale will differ according to whether the by-pass 37 is closed or open and also, when the by-pass is open, according to the size of the orifice of the orifice piece 38.

The scale or scales may be marked directly on the outer tube 11, but most desirably a removable scale plate 50 is provided mounted behind and close to the tubes on the scale support or back piece 40 to which as shown it is secured by cap screws 51.

To insure freedom of movement of the float, it is desirable that the float shall be given a rotary movement by the up-flowing gas or other fluid. This result has been secured heretofore by a special formation of the float with inclined or spiral grooves or passages, and a float of this kind may of course be used in my meter. I have found that the desired rotation of the float and consequent free vertical movement and immediate and close indication of changes in the rate of flow, may be secured by causing a rotary or whirling movement of the up-flowing fluid in the float tube. This rotary movement of the up-flowing fluid may be secured in a simple manner by causing the fluid to enter the float tube tangentially, and for this purpose the inlet opening 12 is best a tangential opening through the side of the tube, for example, as shown in Fig. 4. A way of securing this result with a float tube having a straight radial side inlet opening is illustrated by Figs. 5 and 6, that is, the float tube is adjusted with relation to the outer tube 11 so that its lower end lies close to or against the wall of the tube 11 with the inlet opening facing the closely adjacent wall of the tube 11 and with one edge of the opening slightly closer to the wall of the tube 11 than the other. When the inlet opening 12 is in the side of the tube as shown, a rotary movement of the up-flowing fluid is found to result whenever the opening is sufficiently small as compared to the rate of flow, even though the opening is not intentionally or noticeably tangential. The rotation of the float secured by the rotary or whirling movement if the fluid flowing upward in the float tube tends to prevent any slight adhesion of the float to the wall of the float tube which might otherwise occur.

I find it most desirable to use a float of elongated form and of greatest diameter at its upper end as shown in the drawings, that is, one having a length several times its greatest diameter. I also find that if such a float is formed with straight sides there is, even in spite of the rotary movement of the up-flowing fluid, still some liability of the float adhering or becoming frozen to the side of the float tube. This liability is overcome, however, by shaping the float with enlarged ends one of greater diameter than the other and with a comparatively slender intermediate portion, so that the float will have only two points of contact with the wall of the tube. A good shaped float is that shown in Figs. 1 and 2, which has a narrow part of greatest diameter at the top, from which it tapers downward first sharply and then more gradually, that is, it tapers concavely downward, and has its lower end of slightly greater cross-section than the part immediately above it but smaller than the head. A float of slightly different shape which has worked well is that shown in Fig. 7, which consists of a stem having a spherical enlargement or bead at each end, the bead at the top being larger than the one at the bottom. A two-point-contact float such as above described has also an advantage over a tapering float having straight sides in that with such a two-point-contact float the distances between unit scale markings do not decrease so rapidly as the higher markings are approached as is the case with a float having straight sides. It should be noted here also that with my construction I quite effectually overcome the tendency of the float to dance or oscillate up and down in the tube. This steadiness of position of the float and absence of vertical oscillation in my meter is attributable not only to the rotary movement imparted to the float, but also, as I believe, to the concave shape of the float, and especially to the fact that the part of greatest diameter of the float at its top is not extended lengthwise of the float but is narrow, forming practically merely an edge of extreme diameter. The float may be made of any suitable material and is of such form that it may be readily made of glass, and I find it desirable to make it of glass as all liability of corrosion even with a gas such as chlorin is thereby avoided, and the float may be solid or more or less hollow as desired and as the desired weight of the float may dictate. Either of the floats shown may be used large end down with good results, but I consider it best to use the floats large end up as shown. By forming the float tube with a closed lower end and a side inlet opening as shown, I secure the advantage that the closed end serves as a support for the float when it is not raised by fluid flowing through the tube. The inlet opening should of course be so near the closed end of the tube that when the float is resting at the bottom of the tube its upper end will extend above the inlet opening.

It is to be understood that the invention is not to be limited to the exact construction, arrangement and combination of parts as shown in the drawings and to which the foregoing description has been largely confined, but that it includes changes and modifications thereof within the claims.

What is claimed is:

1. A float meter, comprising a tapered float tube through which fluid to be measured flows, an indicating float in said tube, and a chamber surrounding said tube, an opening being provided between said chamber and the interior of the float tube whereby a pressure is maintained within said chamber substantially equal to the pressure within the float tube.

2. A float meter, comprising a tapered float tube through which fluid to be measured flows, an indicating float in said tube, and a chamber surrounding said tube, an opening into said chamber being provided through which the fluid may enter said chamber to maintain the pressure therein substantially equal to the pressure within the float tube.

3. A float meter comprising a tapered float tube through which fluid to be measured flows, an indicating float in said tube, a tube surrounding the float tube and spaced therefrom to provide a chamber surrounding the float tube, and connections for the fluid to be measured arranged to cause said fluid to pass through said chamber.

4. A float meter comprising a tapered float tube through which fluid to be measured flows, an indicating float in said tube, a tube surrounding the float tube and spaced therefrom to provide a chamber surrounding the float tube, and connections for the fluid to be measured arranged to cause said fluid to pass through said chamber before entering the float tube.

5. A float meter comprising a tapered float tube through which fluid to be measured flows, an indicating float in said tube, means for supporting the upper end of the float tube, a connection for the passage of gas from the upper end of the float tube, a tube surrounding the float tube having a closed lower end and supported at its upper end at a point below the point of support of the float tube, and a connection for the flow of gas into the upper end of said outer tube, the float tube having an inlet opening for the flow of gas from the said outer tube into the lower portion of the float tube.

6. A float meter comprising a connecting head having an inlet passage and an outlet passage, a float tube having its upper end secured in said head and in communication with said outlet passage and having an inlet opening at its lower end, and an outer tube surrounding the float tube closed at its lower end and having its upper end secured in said head at a point below the point of support of the float tube and in communication with said inlet passage.

7. A float meter comprising a connecting head having an inlet passage and an outlet passage, a float tube having its upper end secured in said head and in communication with said outlet passage and having an inlet opening at its lower end, an outer tube surrounding the float tube closed at its lower end and having its upper end secured in said head at a point below the point of support of the float tube and in communication with said inlet passage, and a by-pass between the inlet passage and the outlet passage.

8. A float meter comprising a tapered float tube, an indicating float in said tube, an outer tube surrounding the float tube, a fluid inlet to said outer tube, and an opening for the passage of fluid from said outer tube into the lower part of the float tube arranged to cause the fluid flowing through the float tube to have a rotary movement.

9. A float meter comprising a tapered float tube through which fluid to be measured flows, an indicating float in said tube, an outer tube surrounding the float tube, and a fluid inlet to said outer tube, the float tube having a closed lower end which provides a support for the float and having an inlet opening through the side of the tube near the bottom thereof.

10. A float meter comprising a tapered float tube through which fluid to be measured flows, an indicating float in said tube, and means for imparting a rotary movement to the fluid flowing through said tube.

11. A float meter comprising a tapered float tube through which fluid to be measured flows, an indicating float in said tube, and a tangential inlet opening into the lower end of said tube whereby a rotary movement is imparted to the fluid flowing through said tube.

12. A float meter comprising a tapered float tube, means for imparting a rotary movement to fluid flowing through said tube, and an indicating float in said tube of elongated form and having enlarged ends one of which is of greater circumferential size than the other.

13. A float meter comprising a tapered float tube, means for imparting a rotary movement to fluid flowing through said tube, and an indicating float in said tube of elongated form and having enlarged ends of which the upper one is of the greater circumferential size.

14. A float meter float of elongated form largest at its upper end and concavely tapered downward and having its lower end smaller than its upper end but greater in cross-section than the part immediately above it.

15. A float meter float of elongated form having an outwardly flaring upper end with a narrow edge at its extreme diameter, and being concavely tapered downward.

In testimony whereof I have hereunto set my hand in the presence of two subscribing witnesses.

GEORG ORNSTEIN.

Witnesses:
A. L. KENT,
JAMES N. TIMMERMANN.